United States Patent [19]

Imazaike

[11] 4,110,868
[45] Sep. 5, 1978

[54] AIR DAMPER

[76] Inventor: Yasutaka Imazaike, 8-22, Tanabenishino-cho, Higashisumiyoshi-ku, Osaka-shi, Osaka, Japan

[21] Appl. No.: 770,150

[22] Filed: Feb. 18, 1977

[30] Foreign Application Priority Data

Feb. 23, 1976 [JP]  Japan .............................. 51-20805[U]
Feb. 23, 1976 [JP]  Japan .............................. 51-20806[U]

[51] Int. Cl.$^2$ ............................ E05F 3/00; E05F 5/10
[52] U.S. Cl. ............................................. 16/84; 16/66
[58] Field of Search .................. 16/49, 51, 66, 82, 84, 16/85; 49/137; 188/317, 297, 281, 282, 318; 292/341.12

[56] References Cited

U.S. PATENT DOCUMENTS

| | | | |
|---|---|---|---|
| 1,013,762 | 1/1912 | Gibbs | 16/84 |
| 2,074,008 | 3/1937 | Wolf | 16/84 |
| 2,953,811 | 9/1960 | Hall | 16/66 |
| 3,570,635 | 3/1971 | Takagi | 188/279 |
| 3,831,626 | 8/1974 | Peddinghaus | 188/282 |
| 3,887,961 | 6/1975 | Saajos | 16/51 |
| 4,004,662 | 1/1977 | Sorgatz et al. | 188/282 |

FOREIGN PATENT DOCUMENTS 671,925  5/1952  United Kingdom ..................... 188/279

*Primary Examiner*—Ronald Feldbaum
*Attorney, Agent, or Firm*—Frank J. Jordan

[57] ABSTRACT

An air damper comprises a cylinder having air ports at its upper and lower portions, a piston rod, a piston movably mounted on one end of the piston rod, a return spring, an air passage provided between upper and lower chambers within the cylinder which passage is opened and closed by the movement of the piston, and an air regulating valve press-fit into the lower air port portion of the cylinder.

11 Claims, 5 Drawing Figures

AIR DAMPER

This invention relates to improvements in air dampers for use in stereophonic sound systems and in various other appliances for absorbing shocks when the lid of such appliance is closed. The invention relates more particularly to an air damper including a piston which is easy to make and provided with an air passage of simplified construction located between upper and lower chambers on the opposite sides of the piston so as to render the piston smoothly returnable, the air damper thus being made easy to assemble.

With conventional air dampers of this type, the piston is generally provided with a large diameter flange having an air aperture, a small diameter flange opposed to the large diameter flange, and a seal ring loosely interposed between the two flanges. When the piston advances, the small diameter flange comes into contact with the seal ring to block the flow of air, while during the return stroke of the piston, the large flange comes into contact with the seal ring, permitting air to flow through the aperture and into the space between the seal ring and the small diameter flange. Thus, the air flow passage has a complex construction, which renders the piston costly to make and requires a cumbersome assembling procedure, for example, for the installation of the seal ring. Morever, the piston rod must be connected to the piston with high precision to ensure airtightness.

The cylinder is usually made of brass or like metal and is equipped with air regulating valve means comprising a synthetic resin bushing fixedly mounted in the lower end of the cylinder having an air port and an adjusting screw threaded into the bushing so as to be movable into or away from the air port to provide control of the rate of flow of air into or out of the lower chamber during the stroke of the piston. The installation of the bushing into the cylinder necessitates a very troublesome procedure in which the bushing is fitted in the lower end of the cylinder and the cylinder end is crimped at several portions to securely retain the busing in place. This procedure is inefficent, costly and does not reliably ensure airtightness between the bushing and the inner surface of the cylinder.

An object of this invention is to simplify the construction of the air flow passage of the piston of an air damper.

Another object of this invention is to provide a construction in which the piston and piston rod of an air damper can be readily connected together.

Another object of this invention is to provide an air damper which is made easy to manufacture by simplifying the construction of its piston.

Another object of this invention is to provide an air damper construction in which air can smoothly pass through the piston thereof.

Another object of this invention is to provide an air damper having outstanding durability.

Another object of this invention is to provide an air damper construction in which the bushing of its air regulating valve is readily installable in the cylinder.

Still another object of this invention is to provide an air damper construction which assures airtightness between the bushing of the air regulating valve and the cylinder in which such valve is incorporated.

Other features and advantages of this invention will become more apparent from the following description of the invention.

In order that the invention may be more fully comprehended it will now be described, by way of example, with reference to the accompanying drawings, in which.

Figure 1:
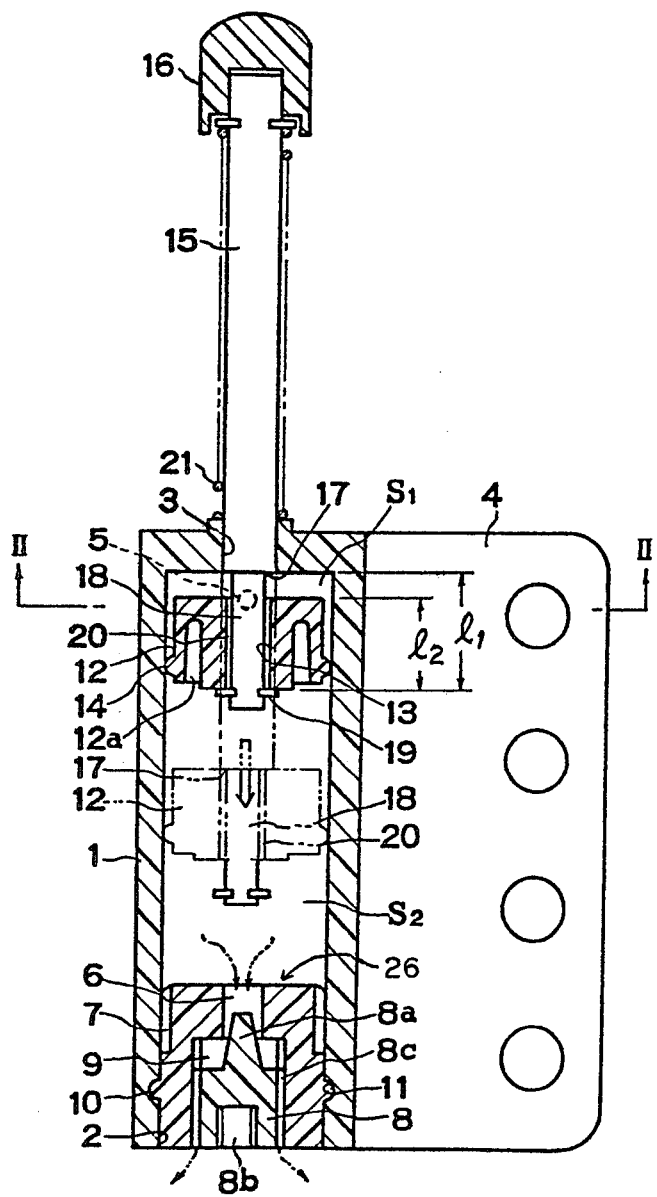
FIG. 1 is an elevational view partly in cross-section, of an air damper in accordance with one embodiment of this invention.
Figure 2:
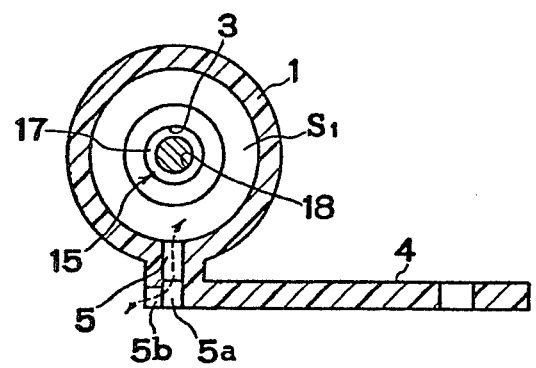
FIG. 2 is a cross sectional view of the air damper of FIG. 1 taken along the line II—II thereof.

With reference to the drawings there is shown, a cylinder 1 made of an oil-containing polyacetal or like synthetic resin. The cylinder has an open lower end 2 and a closed upper end in which there is a rod guide hole 3. An attachment member 4 for securing the cylinder 1 to a specified portion of a stereophonic sound system or like appliance is integral with the cylinder 1 and extends laterally from the outer rear surface of the cylinder 1. Because the cylinder 1 and the attachment member 4 are integral with each other, they are very easy to make. The attachment member 4, when secured to an appliance, maintains the cylinder 1 in place against any inadvertent movement in the axial or circumferential direction thereof. According to this invention, however, attachment member 4 may be made independently of the cylinder 1 and secured to the cylinder 1 by suitable means. The cylinder 1 is provided at its upper and lower ends with air ports 5 and 6 respectively. The air port 5 extends through the cylinder wall and attachment member 4 to open at the rear surface of the attachment member 4. In the portion of the rear surface of the attaching member 4 where the air port 5 is open, a groove 5a extends axially of the cylinder 1, and one side wall defining the groove 5a is partially cutout as at 5b to keep the air port 5 in communication with the outside so that the air port 5 will not be closed when the attaching member 4 is secured to the appliance. The air port 5, which is not exposed, will not impair the appearance of the device while ensuring the flow of air.

A piston 12 made of silicone rubber or a like synthetic resin has a center bore 13 for receiving a rod 15 therethrough and a sealing projection 14 on its outer peripheral surface. The piston 12 is dimensioned to be reciprocally within the cylinder 1, with the sealing projection 14 held in sealing contact with the inner surface of the cylinder 1. To permit the sealing projection 14 to elastically and intimately contact the inner surface of the cylinder 1, the piston 12 is formed wih an annular axially extending cavity 12a. The upper end of rod 15 is provided with a cap 16 and the lower end portion of the rod extends through guide hole 3 and connected to the piston 12 within cylinder 1. To achieve such connection between rod 15 and the piston lower end of the rod portion has a stepped portion or shoulder 17 to provide a portion 18 therebeyond having a diameter smaller than the diameter of the bore 13 of the piston 12 and a length greater than the axial length of the bore 13 by a specified dimension. The reduced diameter portion 18 extends through the bore 13 and is provided at its extreme end with a retaining member 19 such as an E-shaped ring. The rod 15 thus connected to the piston 12 is axially slidable relative to the piston 12 by an amount corresponding to the difference between the length $l_1$ between the stepped portion or shoulder 17 and the retaining member 19 and the axial length $l_2$ of the bore 13. Between the outer peripheral surface of the reduced diameter portion 18 and the inner peripheral surface of bore 13, there is formed an air passage 20 which is open at the upper and lower surfaces of the piston 12. The retaining member 19, which may be made of any desired material, engages the lower surface of the piston 12 in such manner that it does not close the lower opening of the air passage 20.

A coiled spring 21 surrounds the rod 15 for automatically returning the piston to its upper position. The spring 21 is positioned between the cap 16 and the upper end of the cylinder 1. Alternatively, the spring 21 may be provided within the cylinder 1 between a bushing 7 and the piston 12.

An air regulating valve means 26 is provided at the lower end of the cylinder 1 and comprises the bushing 7 and an adjusting screw 8. The bushing 7 is made of a synthetic resin, such as polyacetal, having high strength and suitable elasticity, and is in the form of a cylinder having an open lower end and an upper end formed with the aforesaid air port 6. The bushing 7 is internally threaded as at 30 (note FIG. 3). At a location slightly before the axial midportion of the bushing 7, there is formed on its outer peripheral surface a peripheral projection 10 extending over the entire circumference a groove 11 is formed in the cylinder 1 to receive projection 10. The portion 22 of the bushing 7 below the projection 10 has an outside diameter $d_2$ which is larger than the inside diameter $d_1$ of the cylinder 1. The portion of the bushing above projection 10 has an outside diameter $d_3$ slightly smaller than the inside diameter $d_1$ of the cylinder 1. The specific dimensional difference between the diameter $d_2$ of the portion 22 of the bushing 7 and the inside diameter $d_1$ of the cylinder 1 is selected in accordance with the material and wall thickness of the cylinder 1 and the bushing 7.

To install the bushing 7 in the cylinder 1, the bushing 7 is placed in the open lower end 2 of the cylinder 1. By virtue of the elasticity of the cylinder 1 and bushing 7 both of which are made of synthetic resin, the projection 10 on the bushing 7 is engageable in the groove 11 of the cylinder 1, and the large diameter portion 22 of the bushing 7 mounted in the lower end of the cylinder 1 with a press fit. Due to the engagement of the projection 10 in the groove 11 and the biasing engagement of the portion 22 against the inner peripheral end surface of the cylinder 1, the bushing can be rigidly and hermetically retained in the cylinder 1 without any possibility of its inadvertent release. Thus, the bushing 7 is installable in the cylinder 1 merely by being force fit therein through a simplified procedure and therefore inexpensively without the necessity of a subsequent procedure such as crimping. Moreover, this mode of installation ensures airtight contact between the bushing 7 and the inner surface of the cylinder 1.

The adjusting screw 8, like bushing 7, is made of a synthetic resin such as polyacetal. The screw 8 has a truncated conical protrusion 8a at its upper end and a cavity 8b in its lower end for turning of the screw. The screw 8 is externally threaded, with a portion of the circumference of its outer peripheral surface left unthreaded. The unthreaded portion provides an air flow channel 8c. The adjusting screw 8 is screwed into the bushing 7 to a selected depth, thereby determining the amount of advance of the protrusion 8a into the air port 6. In such manner the area of the opening of the port 6 is adjustable. With the air regulating valve means having the foregoing construction, air flows through the air port 6, by means of the space 9 between the bushing 7 and the adjusting screw 8 and the air flow channel 8c from inside or outside of the cylinder 1. The air flow rate is controllable by the extent of threading of the adjusting screw 8 into the bushing.

The air damper of the above construction operates in the following manner. When, for example, the lid of a stereophonic sound system or like appliance is open, with the rod 15 free from any load other than that of spring 21, the piston 12 is urged into the upper end of the interior of the cylinder 1 and the upper end of piston 12 is spaced apart from the stepped portion or shoulder 17 of the rod 15 as shown in FIG. 1. The air passage 20 is therefore open to the chambers $S_1$ and $S_2$ on the upper and lower sides respectively of the piston 12, maintaining such chambers $S_1$ and $S_2$ in communication with each other. When the lid is closed, thereby loading the rod 15, the rod 15 and the piston 12 advance downwardly against the coiled spring 21. Initially the rod 15 advances alone until shoulder 17 engages the upper surface of the piston. Then both the rod 15 and piston 12 advance together as indicated by the phantom line in FIG. 1. The stepped portion 17, when in contact with the piston 12, closes air passage 20 to the upper chamber $S_1$, thereby preventing communication of the upper chamber $S_1$ with the lower chamber $S_2$. As piston 12 moves downwardly within the cylinder 1 the air within the lower chamber $S_2$ is gradually forced out from the cylinder 1 through the air port 6 in the bushing 7 and through the air flow channel 8c. The resulting air resistance provides a cushioning effect for absorbing the impact involved in the closing of the lid. The lid thus automatically and quietly closes under the influence of gravity. On the other hand, air is introduced simultaneously at a specified rate into the upper chamber $S_1$ through the air port 5 in the upper end of the cylinder 1. The pneumatic cushioning force is suitably adjustable in accordance with the weight of the lid or the like external load by turning the adjusting screw 8 and thereby regulating the rate flow of the air from the lower chamber $S_2$.

Figure 3:
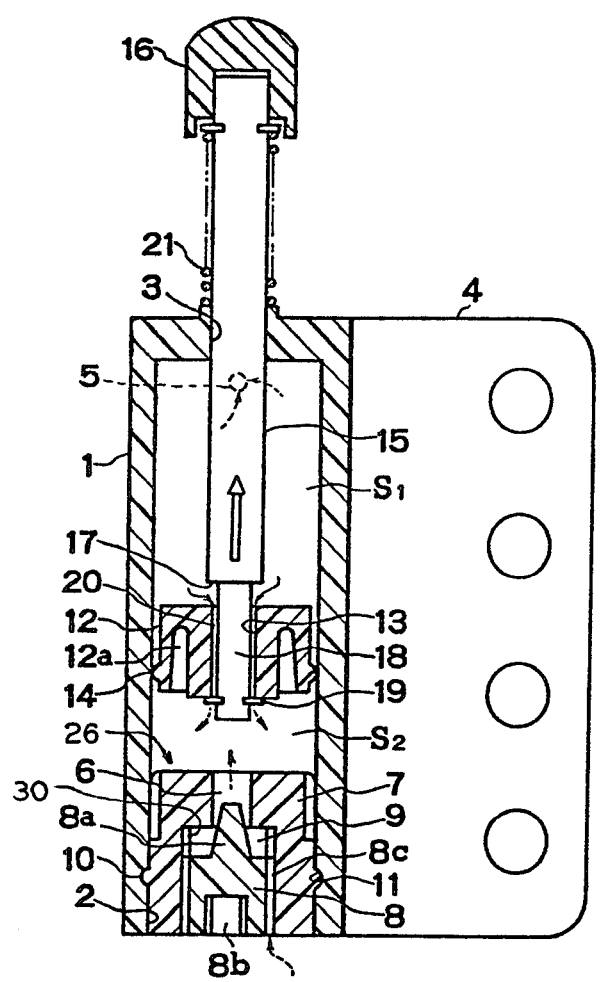
FIG. 3 is a view similar to FIG. 1 illustrating the piston on its return stroke.
Figure 4:
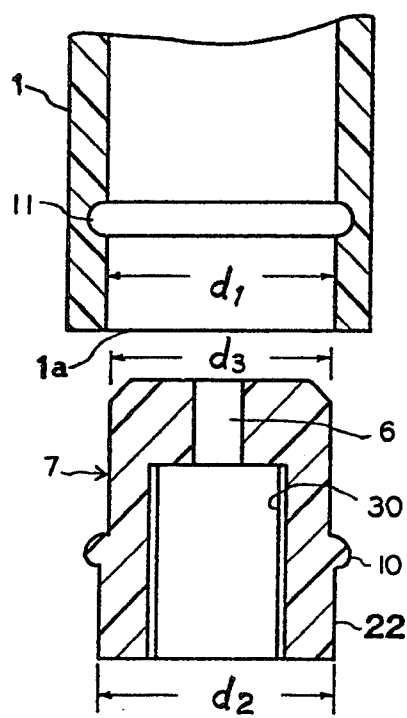
FIG. 4 is an exploded cross sectional view of air regulating valve used in the air damper of the invention means.

When the lid is opened, the rod 15 and the piston 12 start to return under the force of the coiled spring 21. At this time, the rod 15 alone initially moves upwardly. Thereafter when the retaining member 19 engages with the end of the piston 12 as shown in FIG. 3 both the rod 15 and the piston 12 return together. Accordingly, the stepped portion 17 of the rod is held out of contact with the upper surface of piston 12, leaving the opening of the air passage 20 for the upper chamber $S_1$ unobstructed and thereby permitting communication between the upper and lower chambers $S_1$ and $S_2$. Consequently, a certain amount of the air within the upper chamber $S_1$ flows from the cylinder 1 through the air port 5, while a certain amount of the air flows into the lower chamber $S_2$ by way of the air passage 20. A quantity of air also flows into the lower chamber $S_2$ via the air port 6. These air flows reduce the resistance of the air during the return of the piston 12, thereby enabling the piston 12 and rod 15 to move backward smoothly and at a suitable velocity.

The air damper is characterized by the construction of the air flow passage between the upper and lower chambers $S_1$ and $S_2$ namely by the air passage 20 defined by the reduced diameter portion 18 of the rod 15 loosely extending through the bore 13 of the piston 12 and by the inner peripheral surface forming the bore 13, and with the provision of retaining member 19 at the extreme end of the portion 18. Such very simple construction serves to simplify the structure of the piston 12 and assembly of the parts, as compared with conventional devices.

Figure 5:
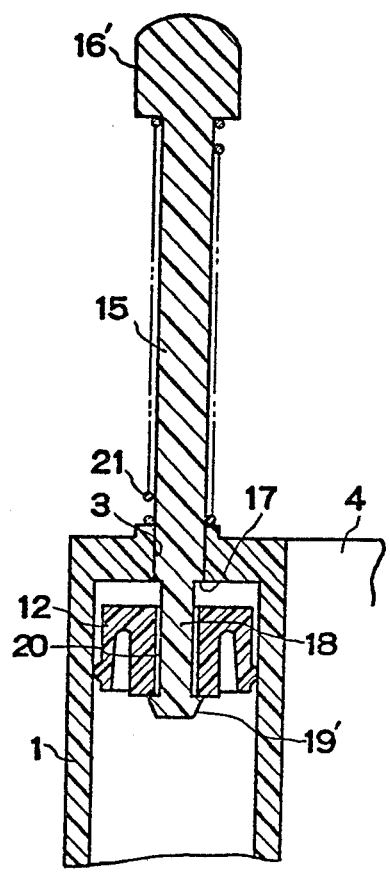
FIG. 5 is a cross sectional view showing an air damper constructed in accordance with another embodiment of this invention.

FIG. 5 shows another embodiment of the rod 15. The rod 15 is made of synthetic resin and is integrally formed with a retaining member 19' corresponding to the retaining member 19 at its lower end and a head 16' corresponding to the cap 16 at its upper end. The retaining member 19' is formed so as to extend on partially in the circumferential direction to the rod end, such that it will not block the opening of the air passage 20. Desirably the member 19' has a tapered outer peripheral side surface. To connect the rod 15 to the piston 12, the retaining member 19', which is made of an elastic synthetic resin, is forced through the bore 13 in the piston 12. The rod 15 of this embodiment is lightweight and inexpensive and is very simple to make, since there is no need to separately attach the cap 16 and retaining member 19 which are themselves separately made.

In accordance with the present invention the rod is formed at one end with a reduced diameter portion extending through a bore in the piston. A retaining member is provided at the extreme end of the rod, whereby the rod and piston are operatively connected and an air passage is formed between the chambers on opposite sides of the piston to thereby render the piston smoothly returnable. Thus, the air passage is greatly simplified in construction as compared with that of the conventional devices. This also makes it possible to simplify the piston construction, to facilitate the shaping of the piston and to simplify the procedure of assembling the piston and rod whereby the device can be made efficiently at a significantly reduced cost. The construction further ensures the smooth flow of air free of any trouble which frequently arose heretofore due to the degradation of the seal member conventionally here used previously. The present device therefore has high durability and is of enhanced utility.

Further, according to this invention, the bushing is installed in the lower end of the cylinder, utilizing the elasticity of the synthetic resin from which the parts are made, by engaging a projection on the bushing into a groove of the cylinder and by forcing a large-diameter portion of the bushing into the cylinder. Thus, the bushing is very easily mountable in place simply by force fitting into the cylinder. This procedure is much simpler than the conventional procedure wherein the rear of the cylinder is crimped to hold the bushing in the cylinder. Further because both the cylinder and bushing are made of synthetic resin, the parts are available at a reduced cost. The low cost and the simplified bushing installing procedure greatly reduce the cost of the overall device. In addition, the engagement between the projection and the groove and the press fit between the large diameter portion of the bushing and the inner surface of the cylinder afforded by the elasticity of the resin make it possible to securely attach the bushing to the cylinder free of any risk of inadvertent displacement and lose, while ensuring effective airtightness between the bushing and the inner surface of the cylinder.

What is claimed is:

1. An air damper comprising:
   a cylinder;
   a rod slidably mounted in one end of said cylinder and projecting outwardly thereof;
   a piston carried on said rod for reciprocation within said cylinder in sealing relation with the inner wall surface thereof and subdividing said cylinder into a first chamber outwardly of said piston and a second chamber inwardly thereof, said piston having an axially extending through bore dimensioned to accommodate movement of said rod therethrough;
   air ports in said cylinder opening respectively into said first and second chambers;
   means for retaining said piston on said rod permitting relative axial movement therebetween;
   spring means for biasing said rod outwardly of said cylinder;
   and a shoulder on said rod defining a section of reduced diameter extending to the end of said rod adjacent said piston reatining means, the radial dimension of said reduced diameter section being less than the diameter of the piston bore to define therewith an axially extending passageway normally establishing communication between said first and second chambers and the length of said section of reduced diameter being greater than the axial extent of said piston bore;
   said rod being slidable inwardly of said cylinder so as to close the air port in said first chamber by positioning of the portion of said rod outwardly of said shoulder over said air port, movement of said rod inwardly of said cylinder also serving to effect engagement of said piston by said shoulder to prevent communication between said first and second chambers by closure of said passageway therebetween.

2. An air damper according to claim 1, wherein said piston retaining means is positioned on said rod inwardly of the adjacent end of the piston.

3. An air damper according to claim 1, wherein an attachment member is formed integrally with said cylinder and is adapted to mount the air damper on a selected object in such manner that the outer end of said rod is located in the path of movement of and engageable by a closure member for the selected object so as to cushion the closing of the object by the closure member.

4. An air damper according to claim 1, wherein the air port in said first chamber extends radially through the wall of said cylinder.

5. An air damper according to claim 1, wherein said piston retaining means is formed integrally with said rod at the extremity thereof remote from the end projecting outwardly of said cylinder and is fabricated from a material of sufficient resiliency to permit insertion thereof through the bore of the piston.

6. An air damper according to claim 1, wherein said cylinder is formed of a synthetic resin having a predetermined degree of resiliency.

7. An air damper according to claim 1, wherein the air port in said second chamber is formed in a bushing positioned in the other end of said cylinder, said bushing and said cylinder being formed of a synthetic resin having a predetermined degree of resiliency and said bushing is press-fit into said other end of the cylinder.

8. An air damper according to claim 7, wherein an annular groove is formed in said cylinder adjacent said other end thereof and a peripheral projection is formed on said bushing dimensional to fit within said groove and to thereby resiliently retain said bushing in said cylinder.

9. An air damper according to claim 8, wherein the outer diameter of said bushing outwardly of said peripheral projection is greater than the inner diameter of the cylinder to thereby provide a press-fit between the bushing and cylinder.

10. An air damper according to claim 7, wherein said bushing is provided with an axially extending recess and the air port in said second chamber extends axially through said bushing and normally communicates with said recess, an adjusting screw being mounted within said recess movable axially therein to thereby regulate the air flow through said air port in said bushing.

11. An air damper according to claim 10, wherein cooperable threads are formed on said bushing and adjusting screw for selectively regulating the axial positioning of said screw in said bushing and thereby regulating the air flow through the air port in the bushing.

* * * * *